United States Patent [19]

Gray

[11] 4,364,014

[45] Dec. 14, 1982

[54] OPTICAL MODULATOR

[76] Inventor: Richard W. Gray, Box 5210, Santa Monica, Calif. 90405

[21] Appl. No.: 891,542

[22] Filed: Mar. 30, 1978

[51] Int. Cl.³ .............................................. H01S 3/10
[52] U.S. Cl. ...................................... 330/4.3; 372/8; 372/25; 332/7.51; 372/26
[58] Field of Search .................... 331/94.5 M, 94.5 N, 331/94.5 Q; 330/4.3, 45; 332/7.51; 307/312; 372/8, 18, 19, 21, 25, 26

[56] References Cited

U.S. PATENT DOCUMENTS

| 3,242,440 | 3/1966 | Koester et al. | 331/94.5 M |
| 3,270,291 | 8/1966 | Kosonocky | 331/94.5 Q |
| 3,440,562 | 4/1969 | Koester | 331/94.5 Q |
| 3,521,070 | 7/1970 | Duguay et al. | 332/7.51 |
| 3,538,452 | 11/1970 | Burgwald et al. | 331/94.5 M |
| 3,984,785 | 10/1976 | Riseberg et al. | 331/94.5 M |
| 4,038,610 | 7/1977 | Nishizawa et al. | 332/7.51 |
| 4,079,339 | 3/1978 | Kobayashi et al. | 331/94.5 M |

FOREIGN PATENT DOCUMENTS 1514411  3/1968  Fed. Rep. of Germany ....... 330/4.3

OTHER PUBLICATIONS

Pheneger, "Interaction Effects Between Coupled Lasers", p. 116, Stamford Univ., Order No. 68-15,087, Thesis.
Roslear, "Laser Modulation Control Method", 8/69, p. 485, PBM Tech. Discl. Bull., vol. 12, #3.

Primary Examiner—Nelson Moskowitz
Attorney, Agent, or Firm—Jones, Tullar & Cooper

[57] ABSTRACT

An optical modulator is provided in which one light beam is modulated by another. The modulator of the invention includes a saturable medium which is capable of amplifying an optical signal by stimulated emission of radiation. Two optical signals, in the form of two light beams are caused to pass through the medium and to emerge from the medium in amplified form. The beams, however, are caused to have different gains in the medium either by causing the beams to have different path lengths, or by other means. The beams are intercoupled by cross-saturation of the medium. Thus, any variations in the intensity of one of the beams causes a change in intensity in the other beam. Since one of the beams has a greater gain than the other, a small change in the intensity of one of the beams will produce a large change in the intensity of the other beam, thus producing in many aspects the optical analog of the transistor. The modulator of the invention shall be referred to herein as an "opto-optic" modulator.

8 Claims, 9 Drawing Figures

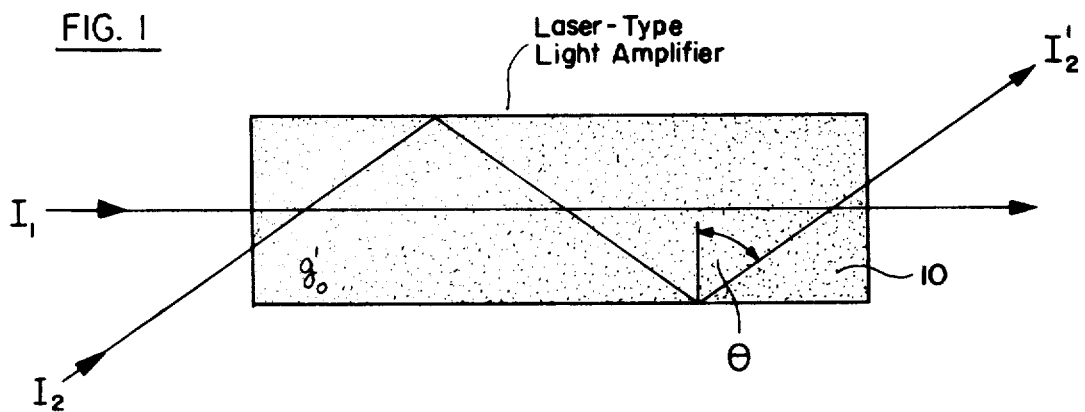
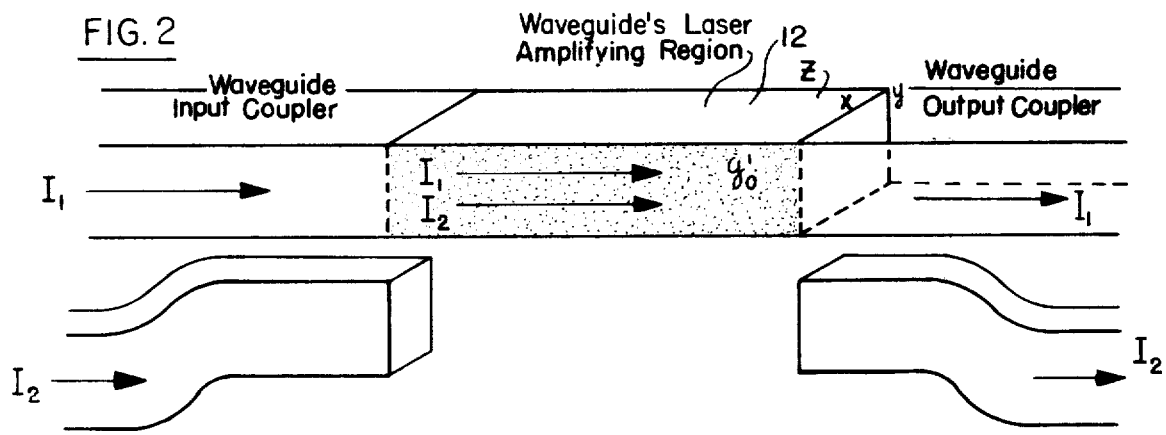
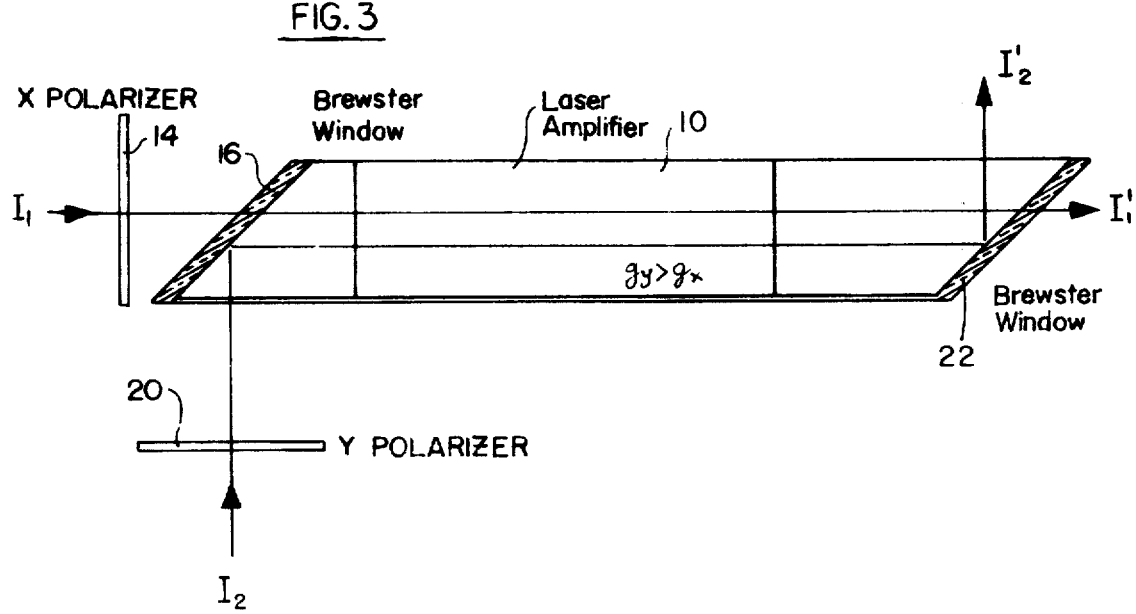

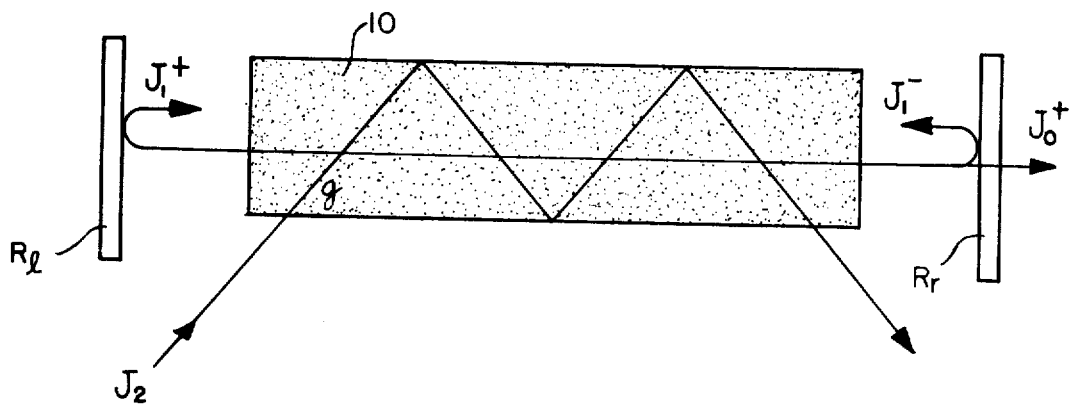
FIG. 4
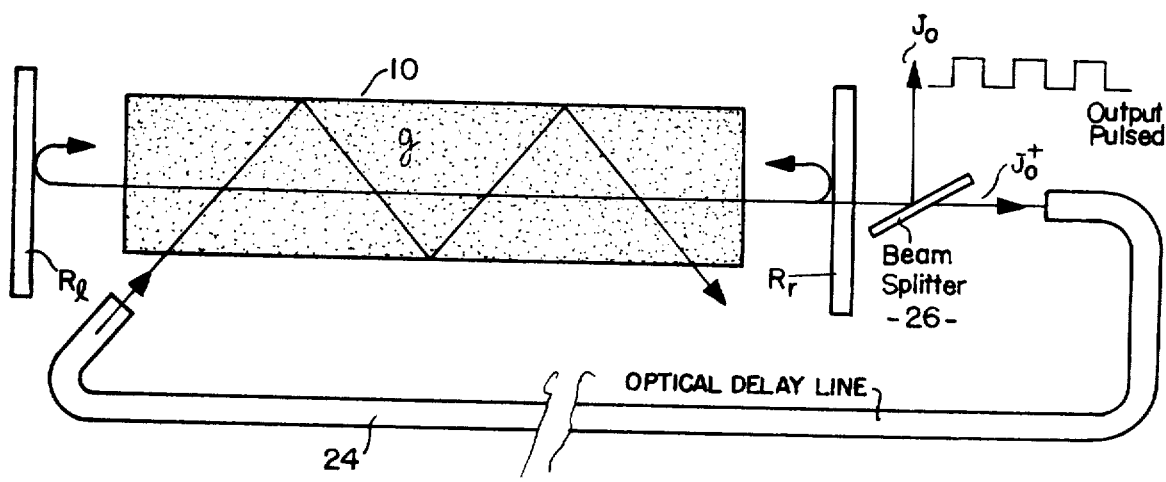
FIG. 5
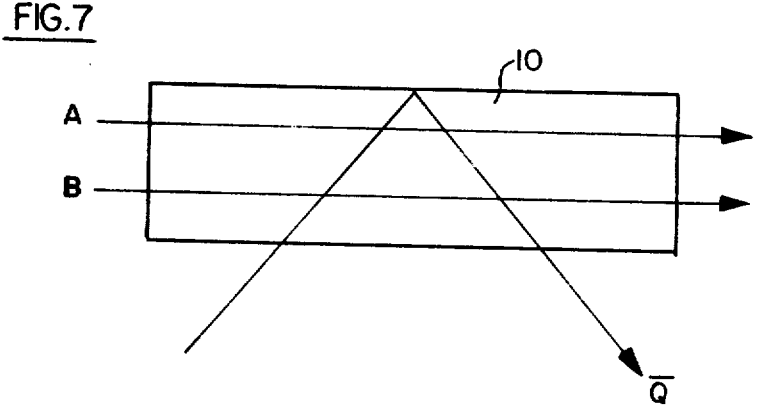
FIG. 7
FIG. 8
| A | B | $\overline{Q}$ |
|---|---|---|
| 0 | 0 | 1 |
| 0 | 1 | 0 |
| 1 | 0 | 0 |
| 1 | 1 | 0 |

OPTICAL MODULATOR

BACKGROUND OF THE INVENTION

Coupling between laser modes has been considered by many investigators in the prior art, see for example, W. E. Lamb, Physics Review, 134A 1429 (1964); J. A. Texter and E. E. Bergmann, Physics Review, A Volume 9, No. 6 P2649, June 1974. Coupled lasers have been studied extensively, see for example, M. B. Spencer and W. E. Lamb, Physics Review A, Volume 5, No. 2 P893, February 1972; and the injection locking effect has been used to make efficient and fast modulators, see for example, L. G. DeShayer and E. A. Maunders, I.E.E.E. Journal of Quantum Electronics, Volume QE4, No. 10, P642, October 1968.

The techniques described in the aforesaid publications, however, require precise spectral and cavity control. Another type of optical modulator is also known to the prior art, which is based on variations of the transmission characteristics of a Fabry-Perot cavity which occur when the cavity is filled with a saturable absorber, see for example Seidel U.S. Pat. No. 3,610,731 and S. L. McCall Physics Review 4, Volume 9, P1515, 1974; or with a medium with a non-linear index of refractions, see T. Griechkowsky, Applied Physics Letters, Volume 31, No. 7, P437, October 1977.

The opto-optic modulator of the present invention represents a distinct improvement over the modulators described in the aforesaid publications in that it is eminently simple in its construction and control, and economical and inexpensive to construct. The opto-optic modulator of the invention has wide utility in the field of optical signal generation and processing. The modulator, as described briefly above, uses one light signal to modulate another with gain.

The modulator of the invention is basically an inverter, in that an increase in the intensity of the control optical signal causes a decrease in the intensity of the controlled optical signal. Thus, the implementation of optical equivalents to many electrical and electronic circuits in the practice of the invention is possible. For example, optical equivalents of differential amplifiers, comparators, delay oscillators, and the like, are possible in accordance with the invention.

The basic operating principle of the opto-optic modulator of the invention is premised upon the cross-saturation of two light beams in a gain medium. As pointed out above, if the gains of the two beams in the medium are different, variations of one beam will have a greater effect on the other, resulting in an efficient modulator with gain. Two embodiments of the opto-optic modulator of the invention will be described herein, namely, a modulated amplifier and a modulated oscillator.

As noted above, the advantages of the saturation-based modulators of the present invention include simple fabrication. In addition, the opto-optic modulators exhibits low level input intensity requirements, and applications to both large scale and integrated optical laser systems are feasible. Moreover, substantial amounts of gain are readily available in the opto-optic modulator.

BRIEF DESCRIPTION OF THE DRAWINGS

FIG. 1 is a schematic representation of a modulated amplifier in which two light beams travel along different paths, and which represents one embodiment of the opto-optic modulator of the invention;

FIG. 2 is a schematic representation of a modulated wave guide amplifier which also incorporates the concept of the invention;

FIG. 3 is a schematic representation of a modulated amplifier using polarization-dependent gain, and likewise, incorporating the concepts of the invention;

FIG. 4 is a schematic representation of a modulated laser oscillator also incorporating the invention;

FIG. 5 is a schematic diagram of a modulated delay line oscillator which also represents an embodiment of the invention;

FIG. 7 is an optical equivalent of certain logic gates; and

FIG. 8 is a truth table for the optical circuit of FIG. 7.

DETAILED DESCRIPTION OF THE ILLUSTRATED EMBODIMENTS

Figure 6A:
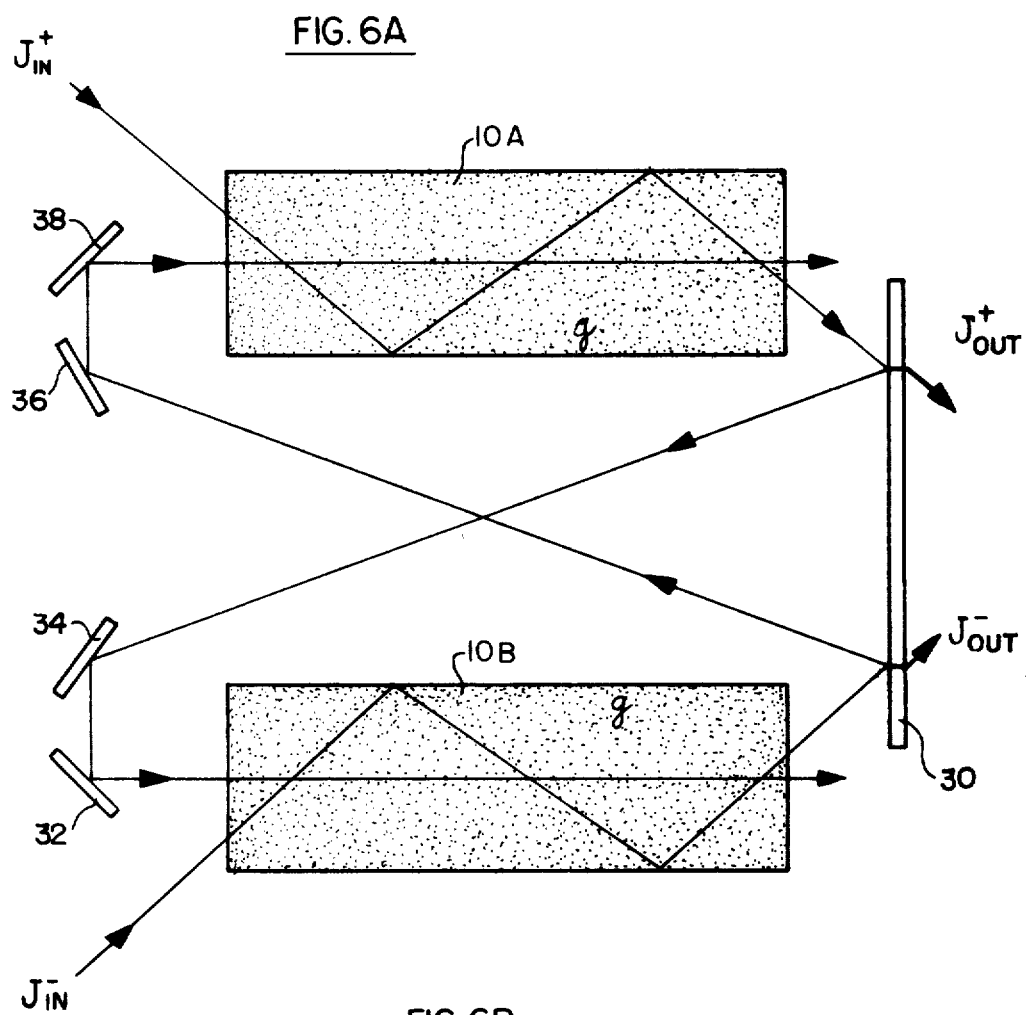
FIG. 6A is a schematic representation of a differential comparator which is formed of modulated amplifiers incorporating the concepts of the invention.

A single basic principle underlies the design of a broad family of optical inverters. Ordinarily one considers the behavior of a laser amplifier to be isotropic in the sense that the amplification of a signal is independent of the signal's polarization, direction of propagation, and phase characteristics. However, one can postulate several types of lasers in which two optical signals experience entirely different levels of amplification. If these signals are then coupled approximately by the non-linearity of the amplification process, a light controlling amplifier results.

A conceptually simple optical inverter is shown in FIG. 1. In the unit of FIG. 1, two light signals in the form of two light beams $I_1$ and $I_2$ are injected into a laser amplifier 10, which has a gain $g_0'$. The beam $I_1$, for example, is the control beam, and $I_2$ is the signal beam. $I_1$ is broad enough to completely saturate the medium in the vicinity of the signal beam. One light beam ($I_1$) goes straight through the medium, and the other ($I_2$) zigzags along the medium with reflections from the sides thereof. The zigzag path is obviously longer and may have a much higher net gain. Therefore, its output $I'_2$ is more sensitive to variations in the medium's gain than the other beam which follows the straight path. This allows the small signal $I_1$ injected into the low gain path to control the larger output $I_2'$ from the high gain path, this being achieved by cross-saturation of the medium.

If the laser medium is homogeneously broadened, and if the light beams $I_1$ and $I_2$ are monochromatic, the rate equations governing the steady-state intensities of the two light beams can be written:

$$\frac{dI_1}{dz} = \frac{g'_o I_1}{1 + y^2 + s'(I_1 + I_2)} - \gamma_1 I_1 \tag{1}$$

$$\frac{dI_2}{dz} = \frac{g'_o I_2/\sin\theta}{1 + y^2 + s'(I_1 + I_2)} - \gamma_2 I_2 \tag{2}$$

where:
$g'_o$ is the ordinary unsaturated line center gain,
$y = 2(\nu - \nu_o)\Delta\nu_h$ is a normalized frequency units of the homogeneous line width, s' is a saturation parameter, and $\gamma_1$ and $\gamma_2$ are distributed loss parameters (including transverse reflection losses).

Equations (1) and (2) are special cases of the more general equations:

$$\frac{dI_1}{dz} = \frac{g_1 I_1}{1 + s(I_1 + I_2)} - \gamma_1 I_1 \quad (3)$$

$$\frac{dI_2}{dz} = \frac{g_2 I_2}{1 + s(I_1 + I_2)} - \gamma_2 I_2 \quad (4)$$

In the latter equations, the two values of gain may in general differ for reasons other than the propagation direction, and the frequency offset factor $1+y^2$ has been incorporated into the gain and saturation parameters.

Similar equations can also be written when the light beams are not monochromatic, and when the laser medium is not homogeneously broadened.

Before proceeding with the analysis, it is appropriate to mention some other inverter geometries which again lead to equations (3) and (4). The embodiment shown in FIG. 1 is most suitable for large scale lasers in which reflecting surfaces can be added externally to the laser medium. In the important application areas of integrated optics the electromagnetic fields are more commonly wave-guided by transverse gradients or discontinuities in the index of refraction or gain of the amplifying medium. Thus the zigzagging ray paths should be associated with higher order modes of the material.

A possible opto-optic inverter modulator is shown in FIG. 2. With a proper choice of dimensions the wave guide coupler indicated to the left of FIG. 2 can efficiently superimpose the light beam $I_2$ on the light beam $I_1$. These two signals then interact competitively in the wave guide amplifying regions 12. The exact form of the wave guide boundaries does not affect the qualitative behavior of the unit. Specifically, a simple assumption is made that the electromagnetic modes are those which would be trapped in a rectangular region with highly conducting boundaries. The representation of FIG. 2 is sufficient to illustrate the relevant phenomena.

The wave equation covering the Z component of the magnetic field of a TE mode in a rectangular wave guide is:

$$\nabla^2 H_z + k^2 H_z = 0 \quad (5)$$

It is convenient to assume an exponential z dependent of the form $$H_z = A \exp(-i\eta z) \quad (6)$$

so that equation (5) reduces to:

$$\frac{\partial^2 A}{\partial x^2} + \frac{\partial^2 A}{\partial y^2} + (k^2 - \eta^2)A = 0 \quad (7)$$

If the wave guide has a width a in the x direction and a thickness b in the y direction the solutions of equation (7) can be written:

$$A = \cos(m\pi x/a) \cos(n\pi y/b) \quad (8)$$

provided that the parameter $\eta$ satisfies the equation $$\eta = (k^2 - m^2\pi^2/a^2 - b^2\pi^2/b^2)^{\frac{1}{2}} = (k^2 - k_c^2)^{\frac{1}{2}} \quad (9)$$

From equations (6) and (9) it follows that the unsaturated intensity gain coefficient is $$g = 2Im(\eta) = 2Im(k^2 - k_c^2)^{\frac{1}{2}} \quad (10)$$

This expression shows that the intensity gain is a function of the transverse mode order. The evaluation of equation (10) is complicated by the fact that in a laser material the propagation constant has the complex form $$k = \beta + i\alpha \quad (11)$$

Thus equation (10) is $$g = 2Im[(\beta + i\alpha)^2 - k_c^2]^{\frac{1}{2}} \quad (12)$$

In most circumstances the condition $(\beta - k_c) >> \alpha$ is satisfied and equation (12) reduces to the approximate result $$g = 2\alpha[1 - (k_c/\beta)^2]^{-\frac{1}{2}} \quad (13)$$

A significant implication of equation (10) is that the gain increases with increasing mode order. Where the ordinary empty wave guide would approach cut-off ($k_c = \beta$), for example, the laser guide has a gain value of $g \simeq 2Im(2i\beta\alpha)^{\frac{1}{2}} = 2(\beta\alpha)^{\frac{1}{2}}$. This value is much greater than the ordinary laser gain $g \simeq 2\alpha$ which prevails for $k_c << \beta$. Thus two wave guide modes of different gains of an integrated opto-optic modulator may be chosen to interact according to equations (3) and (4).

Similar equations can be written for other wave guide configurations.

The polarization characteristics of the laser medium also enables one to distinguish two coupled propagation modes having differeing values of gain. In optically pumped dyes for example it is well known that the gain can have a strong polarization dependence, and the two linear polarization components can be readily distinguished by means of a polarizer. Thus, another basic opto-optic modulator in accordance with the invention is shown in FIG. 3.

In the embodiment of FIG. 3, the light beam $I_1$ is passed through an X-axis polarizer 14, and through a Brewster window 16 into the laser amplifier 10. Laser amplifier 10 has polarization-dependent gain, with the Y-axis gain, for example, greater than the X-axis gain $(g_y >> g_x)$.

The $I_2$ light beam is passed through a Y-axis polarizer 20 and is reflected by the Brewster window 16 into the laser amplifier 10. The $I_2$ light beam is reflected by a Brewster window 22 at the other end of the laser amplifier 10, and emerges as an amplified beam $I'_2$. The light beam $I_1$ passes directly through the amplifier 10 and through the Brewster window 22, and emerges as an amplified beam $I'_1$.

Again the saturation characteristics are governed by equations (3) and (4), however, complete solutions for equations (3) and (4) cannot be obtained analytically.

However, if it is assumed that distributed losses are unimportant, and if normalized intensities of the form $J_n = sI_n$, equations (3) and (4) reduce to:

$$\frac{dJ_1}{dz} = \frac{g_1 J_1}{1 + J_1 + J_2} \quad (14)$$

-continued
$$\frac{dJ_2}{dz} = \frac{g_2 J_2}{1 + J_1 + J_2} \tag{15}$$

From equations (14) and (15) one obtains the relationship $$\left(\frac{1}{g_1 J_1}\right)\left(\frac{dJ_1}{dz}\right) = \left(\frac{1}{g_2 J_2}\right)\left(\frac{dJ_2}{dz}\right) \tag{16}$$

The solution of equation (16) is:

$$J_1^{1/g_1} = c J_2^{1/g_2} \tag{17}$$

where: c is an as yet undetermined constant.

Equations (14) and (17) may be combined to obtain:

$$\frac{dJ_1}{dz} = \frac{g_1 J_1}{1 + J_1 + J_1^{g_2/g_1}/c^{g_2}} \tag{18}$$

The integral of equation (18) is $$\ln\left(\frac{J_{10}}{J_{1i}}\right) + (J_{10} - J_{1i}) + \frac{J_{10}^{g_2/g_1} - J_{1i}^{g_2/g_1}}{g_2 c^{g_2/g_1}} = g_1 l \tag{19}$$

where the subscripts i and o refer respectively to the input and output, and l is the interaction length. With equation (17) the constant c can be expressed in terms of the input intensities yielding the final result $$\ln\left(\frac{J_{10}}{J_{1i}}\right) + (J_{10} - J_{1i}) + \frac{g_1}{g_2} J_{2i}\left[\left(\frac{J_{10}}{J_{1i}}\right)^{g_2/g_1} - 1\right] = g_1 l \tag{20}$$

In the embodiments of FIGS. 1, 2 and 3, the opto-optic modulator was formed by the interaction of two optical signals within a laser amplifier. It is also possible to introduce feedback for one of the signals by means of discrete or distributed mirrors, so that the interaction of a light beam with a laser oscillation mode by the non-linearity of the amplifying medium may be considered. The basic configuration of such an embodiment is shown schematically in FIG. 4. In FIG. 4, mirrors $R_l$ and $R_R$ are positioned at each end of the laser amplifier 10, the laser amplifier having a gain g. These mirrors may be plane reflecting or distributed grating type. The modulating signal $J_2$ enters the amplifier near the left-hand mirror $R_l$ and propagates along the amplifier with a gain coefficient $g_2$. The oscillation mode has a gain coefficient $g_1$ and can be regarded as a super-position of a right traveling wave $J_{1+}$ and a left traveling wave $J_{1-}$. Then the governing equations (14) and (15) are replaced by the following:

$$\frac{dJ_1^+}{dz} = \frac{g_1 J_1^+}{1 + J_1^+ + J_1^- + J_2} \tag{21}$$

$$\frac{dJ_1^-}{dz} = \frac{-g_1 J_1^-}{1 + J_1^+ + J_1^- + J_2} \tag{22}$$

$$\frac{dJ_2}{dz} = \frac{g_2 J_2}{1 + J_1^+ + J_1^- + J_2} \tag{23}$$

Equations (21)–(23) imply the following relationships:

$$\left(\frac{1}{J_1^+}\right)\left(\frac{dJ_1^+}{dz}\right) = \left(\frac{-1}{J_1^-}\right)\left(\frac{dJ_1^-}{dz}\right) \tag{24}$$

$$\left(\frac{1}{g_1 J_1^+}\right)\left(\frac{dJ_1^+}{dz}\right) = \left(\frac{1}{g_2 J_2}\right)\left(\frac{dJ_2}{dz}\right) \tag{25}$$

Equations (24) and (25) have the following solutions:

$$J_1^+ J_1^- = a \tag{26}$$

$$(J_1^+)^{-1/g_1} J_2^{1/g_2} = b \tag{27}$$

where a and b are constants to be determined. Equations (21), (26) and (27) may be combined to yield $$\frac{dJ_1^+}{dz} = \frac{g_1 J_1^+}{1 + J_1^+ + a/J_1^+ + b^{g_2} (J_1^+)^{g_2/g_1}} \tag{28}$$

The integral of equation (28) for an amplifier of length l is:

$$g_1 l = \ln\left(\frac{J_{1r}^+}{J_{1l}^+}\right) + (J_{1r}^+ - J_{1l}^+) - a\left(\frac{1}{J_{1r}^+} - \frac{1}{J_{1l}^+}\right) + \tag{29}$$

$$\frac{g_1}{g_2} b^{g_2} [(J_{1r}^+)^{g_2/g_1} - (J_{1l}^+)^{g_2/g_1}]$$

where subscripts r and l refer respectively to the right-hand and left-hand ends of the amplifying medium.

The coefficients a and b can be determined from equations (26) and (27) together with the boundary conditions:

$$J_{1r}^- = R_r J_{1r}^+ \tag{30}$$

$$J_{1l}^+ = R_l J_{1l}^- \tag{31}$$

Combining equations (30) and (31) yields $$a = R_r(J_{1r}^+)^2 \tag{32}$$

$$b = J_{2l}^{1/g_2}(J_{1l}^+)^{-1/g_2} \tag{33}$$

$$J_{1l}^+ = (R_l R_r)^{\frac{1}{2}} J_{1r}^+ \tag{34}$$

When equations (32)–(34) are substituted into equation (20), the following equation is obtained:

$$J_{1r}^+ = \frac{g_1 l + (\frac{1}{2})\ln(R_l R_r) - (g_1/g_2) J_{2l}[(R_l R_r)^{-g_2/2g_1} - 1]}{(1 - R_r) + (R_r/R_l)^{\frac{1}{2}}(1 - R_l)} \tag{35}$$

Equation (35) is an explicit formula for the right traveling intensity at the right-hand end of the laser amplifier 22 in terms of the input modulating signal $J_{2l}$. If the transmission of the right-hand mirror $R_r$ is $T_r$, then the output intensity is $$J_0^+ = T_r J_{1r}^+ \tag{36}$$

An expression similar to equation (35) can be readily obtained for the intensity incident on the left-hand mirror R, and these formulas can also be expressed in terms of $J_{2r}$ instead of $J_{2l}$. Often one can assume that the reflectivity of one of the mirrors in a high gain laser is close to unity leading to a simplification of the mathematics. For example, if the left-hand mirror $R_l$ has a reflectivity $R_l = 1$, equations (35) and (36) reduce to the simple formula:

$$J_o^+ = g_1 l + (\tfrac{1}{2})ln(R_r) - (g_1/g_2)J_{2l}(R_r^{-g_2/2g_1} - 1) \quad (37)$$

where it is assumed that the coupling mirror exhibits no losses, that is, $T_r = 1 - R_r$.

The light beam input to the oscillating mode may be derived from spontaneous emission of the gain medium.

The opto-optic modulated amplifier and oscillator of the invention can be used to create many equivalents of electrical circuits. For example, in FIG. 5, the output $J_0+$ is coupled back to the input through an optical delay line 24, which may take the form, for example, of a length of optical wave guide. The system of FIG. 5 will oscillate at a frequency inversely proportional to the delay time. A square wave output $J_0+$ may be derived by inserting a beam splitter 26 in the path of the output beam through mirror $R_r$.

A differential amplifier or comparator can be constructed in accordance with the concepts of the present invention, as shown schematically in FIG. 6A. The system of FIG. 6A includes two laser amplifiers 10A and 10B, each with a gain g. A partially reflective mirror 30 is provided which reflects the output from one of the laser amplifiers back into the other laser amplifier, as illustrated. Then, if two optical signals $J_{in}+$ and $J_{in}-$ are introduced respectively to the two laser amplifiers, and by means of the partially reflective mirror 30, together with additional mirrors 32, 34, 36 and 38, outputs $J_{out}+$ and $J_{out}-$ are derived. Depending upon the parameters of gain and reflectivity of the mirror 30, the system of FIG. 6A will act as a differential amplifier or comparator. The system of FIG. 6A is useful for receiving digital data in the presence of noise, as in a fiber optic repeater.

Figure 6B:
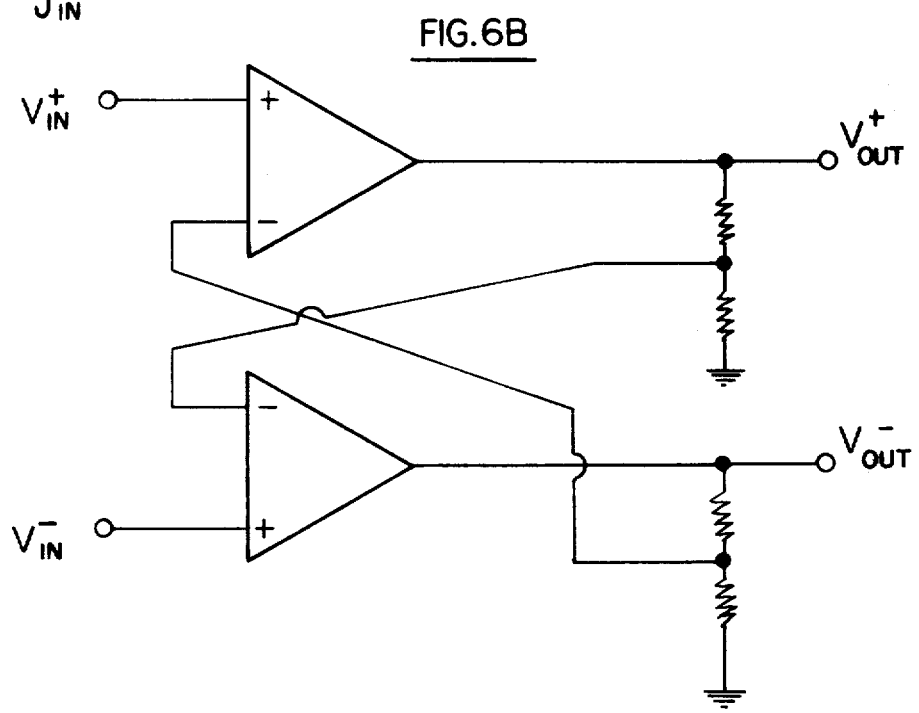
FIG. 6B is the electrical circuit equivalent of the differential comparator of FIG. 6A.

As stated above, the electrical equivalent of the system of FIG. 6A is shown in FIG. 6B.

Logic functions can also be implemented using the opto-optic modulator of the invention.

For example, FIG. 7 shows how a two-input "nor" gate can be constructed, by causing two optical signals A and B to pass through laser amplifier, which control the gain of a third optical signal Q. Then, the transmission of the signal Q through the laser amplifier 10 is in accordance with the truth table of FIG. 8.

Accordingly, the concept of the present invention enables computers to be constructed which process optical signals exclusively. It is obvious that other applications for the concept of the invention are possible, since practically all transistor configurations can be implemented. Moreover, any of the implementations, such as those described above, can be implemented by either a modulated amplifier or a modulated oscillator.

The invention provides, therefore, an opto-optic modulator which is the optical analog of the transistor, and whose operation is predicated upon the cross gain saturation of different modes in a laser amplifier or oscillator. The system of the invention functions as a signal inverter with substantial gain. Moreover, the gain is such that relatively small changes in input produce correspondingly greater changes in output.

Specifically, the system of the invention includes a medium which contains material which can amplify electromagnetic radiation by stimulated emission of radiation, and which has a gain of g per centimeter. Then, when two light beams are incident on the material they will be amplified and will energe from the material with amplified intensities. In one embodiment, one beam is reflected from the wall of the medium, and the other beam goes straight through. Therefore, the beams have different path lengths, so that the beams have different gains.

As described above, there are other ways of obtaining different gains such as optical pumping with polarized light which will give different gains to the two beams if they have different polarizations. The two beams are coupled by cross-saturation of the gain medium g. Therefore, a variation in the intensity of one beam will change the intensity of the other. Since one beam has more gain than the other, it will have a larger sensitivity to gain variation than the other, so that a small change in the second beam will produce a large change in the first beam by saturation of the gain media g.

Since the opto-optic modulator of the invention has gain, it can be used as an amplifier of electromagnetic radiation. The unit actually operates as an inverter, since the output variation is opposite to the input variation. Because of the latter characteristic, and as described above, the unit has many logic applications, signal processing applications, communication system applications, control applications, and many others too numerous to list.

It will be appreciated, of course, that although particular embodiments of the invention have been shown and described, modifications may be made. It is intended in the claims to cover the modifications which come within the true spirit and scope of the invention.

What is claimed is:

1. An optical modulator comprising: a member including an optical gain-saturable medium capable of amplifying optical signals; means introducing a first optical signal into the member for passage through the medium and to be amplified by the medium; and means introducing a second optical signal into the member for passage through the medium to be amplified by the medium with a gain greater than the gain of said first signal, the first and second signals being intercoupled by cross-saturation of the medium such that variations in the intensity of the first optical signal changes the gain in the medium by cross-saturation and thereby produces greater variations in the intensity of the second signal as the first signal passes through the medium.

2. The optical modulator defined in claim 1, in which the first signal is injected into the member in a direction such that it passes through the medium along a straight path, and the second signal is injected into the member in a direction such that it is reflected by the sides of the medium as it passes therethrough.

3. The optical modulator defined in claim 1, and which includes a wave guide containing said member, and coupling said first and second signals into and out of the member.

4. The optical modulator defined in claim 1, and which includes polarizing means positioned in the path of the optical signals to polarize the signals on different axes of polarization, and in which said medium exhibits gain characteristics which differ for the two polarized signals.

5. The optical modulator defined in claim 1, and which includes means to feed back one of the optical signals to create a laser oscillation mode.

6. The optical modulator defined in claim 5, in which said feedback means comprises light-reflecting means.

7. The optical modulator defined in claim 5, in which said feedback means comprises an optical delay line.

8. The optical modulator defined in claim 2, and which includes a second member including an optical gain-saturable medium capable of amplifying optical signals, and means for introducing first and second signals into the two members in directions such that each passes through the corresponding medium in a direction to be reflected by the sides thereof; and means for directing the two output signals into the two members each in a direction to pass through the corresponding medium and control the first and second signals passing therethrough.

* * * * *